(12) United States Patent
Fehring et al.

(10) Patent No.: US 7,798,275 B2
(45) Date of Patent: Sep. 21, 2010

(54) RESTRAINT SYSTEM

(75) Inventors: Michael Fehring, Neuhausen auf den Fildern (DE); Dominic Reutter, Eberbach (DE); Michael Bischoff, Rottenberg (DE); Thomas Schwer, Illertissen (DE)

(73) Assignee: Takata-Petri AG, Aschaffenburg (DE)

( * ) Notice: Subject to any disclaimer, the term of this patent is extended or adjusted under 35 U.S.C. 154(b) by 302 days.

(21) Appl. No.: 12/007,987

(22) Filed: Jan. 17, 2008

(65) Prior Publication Data

US 2008/0203783 A1 Aug. 28, 2008

(30) Foreign Application Priority Data

Jan. 18, 2007 (DE) .................. 10 2007 002 704

(51) Int. Cl.
*B60R 21/013* (2006.01)
*B60R 21/0132* (2006.01)

(52) U.S. Cl. .................. 180/268; 280/807; 297/474; 701/45

(58) Field of Classification Search .................. 180/268; 280/807, 808; 297/480, 483, 474–479; 242/390.8, 242/390.9, 374, 384.1; 701/45
See application file for complete search history.

(56) References Cited

U.S. PATENT DOCUMENTS

| 5,975,633 | A | 11/1999 | Walk et al. |
| 6,037,731 | A | 3/2000 | Fruehauf et al. |
| 6,394,495 | B1 * | 5/2002 | Specht .................. 280/806 |
| 6,746,049 | B2 * | 6/2004 | Pavlov et al. .................. 280/803 |
| 6,758,495 | B2 | 7/2004 | Brambilla et al. |
| 6,786,294 | B2 | 9/2004 | Specht |
| 7,195,089 | B2 * | 3/2007 | Enomoto .................. 180/268 |
| 7,484,585 | B2 * | 2/2009 | Takemura .................. 180/268 |
| 2004/0017073 | A1 * | 1/2004 | Pavlov et al. .................. 280/806 |
| 2004/0108706 | A1 * | 6/2004 | Enomoto .................. 280/807 |
| 2007/0228713 | A1 * | 10/2007 | Takemura .................. 280/753 |

FOREIGN PATENT DOCUMENTS

| DE | 196 24 587 A1 | 1/1998 |
| DE | 197 50 223 A1 | 6/1999 |
| DE | 198 23 058 A1 | 12/1999 |
| DE | 100 05 010 A1 | 8/2001 |
| DE | 101 51 384 A1 | 5/2003 |
| DE | 101 56 837 A1 | 6/2003 |
| DE | 10 2004 062 086 A1 | 7/2006 |
| DE | 10 2005 023 693 A1 | 12/2006 |
| WO | WO 99/47389 | 9/1999 |
| WO | WO 2006/122742 A1 | 11/2006 |

\* cited by examiner

*Primary Examiner*—Paul N Dickson
*Assistant Examiner*—Joseph Rocca
(74) *Attorney, Agent, or Firm*—Foley & Lardner LLP

(57) ABSTRACT

An arrangement for automatically supporting a vehicle occupant in a vehicle seat when lateral dynamic forces are acting includes a restraint system for securing an upper body of the vehicle occupant in a longitudinal direction of the vehicle as a function of the lateral dynamics.

17 Claims, 2 Drawing Sheets

RESTRAINT SYSTEM

BACKGROUND

The invention relates to an arrangement for automatically supporting a vehicle occupant in a vehicle seat when lateral dynamic forces are acting.

SUMMARY

One embodiment of the invention relates to an arrangement for automatically supporting a vehicle occupant in a vehicle seat when lateral dynamic forces are acting. The arrangement includes a restraint system for securing an upper body of the vehicle occupant in a longitudinal direction of the vehicle as a function of the lateral dynamics.

BRIEF DESCRIPTION OF THE DRAWINGS

The advantages and features of the invention will become clear from the following Figures and descriptions of exemplary embodiments.

DETAILED DESCRIPTION

Figure 1:
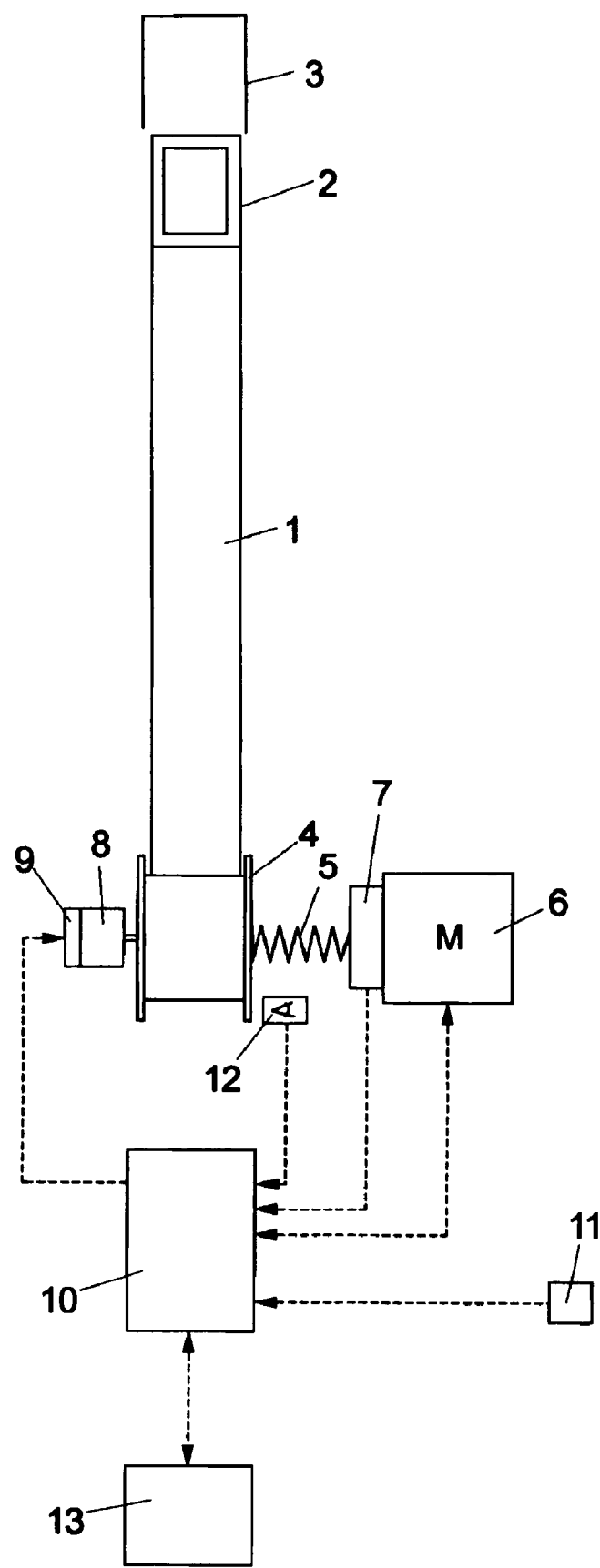
FIG. 1 is a schematic illustration of a seat belt tensioning arrangement according to an exemplary embodiment.

According to one exemplary embodiment, a restraint system may include a vehicle seat with automatically adjustable seat components as disclosed in DE 101 51 384 A1, which is herein incorporated by reference in its entirety. In order to control the seat components, forces that act on the user or occupant of the seat (due to acceleration in one or more directions) may be at least partially sensed to adjust seat components in such a way that the user may be better supported with respect to the forces (e.g., the user may not move around as much due to the forces). In particular, front or lateral edge sections of the seat cushion may be adjusted (e.g., raised).

According to another exemplary embodiment, a restraint system may include an adaptive lateral support of a user of a vehicle seat as disclosed in DE 197 50 223 C2, which is herein incorporated by reference in its entirety. Edge regions of the seat cushion and of a backrest may be adjusted as a function of lateral accelerations of the vehicle and with the velocity being taken into account as a weighting factor. The adjustment of seat cushion parts or backrest parts may allow that at high lateral accelerations the seat is in the shape of a shell with a relatively large depth.

According to another exemplary embodiment, a restraint system may include a seat with movable seat components that can be adjusted as a function of acceleration forces in such a way that the user of the seat may be less affected by the acceleration forces as disclosed in DE 196 24 587 A1, which is herein incorporated by reference in its entirety.

According to another exemplary embodiment, a restraint system may take into account data supplied by a vehicle movement dynamics safety system (for example an ESP system) in the control of vehicle occupant protection devices so that the protection devices activate as disclosed in WO 99/47389, which is herein incorporated by reference in its entirety. A value is calculated from the data of the vehicle movement dynamics safety system and is then compared with a predetermined threshold value. When the threshold value is exceeded, the value is output to the vehicle occupant protection device as an impact signal. For example, in a collision of the vehicle, as soon as the value exceeds the threshold value, the vehicle occupant protection device is activated.

According to another exemplary embodiment a restraint system may sense an imminent lateral impact in a vehicle equipped with a corresponding sensor system and subsequently place lateral elements of a seat in a protective position as disclosed in DE 10 2004 062 086 A1, which is herein incorporated by reference. For example, the restrain system may place the lateral elements in a position that is significantly raised as compared to the sitting surface.

According to another exemplary embodiment, a restrain system adjusts lateral elements of a seat in the direction of a seated person when a dynamic stabilization system of the vehicle intervenes to control a brake system as discloses in DE 198 23 058 C2, which is herein incorporated by reference. Therefore, if automatic braking intervention is activated due to a high lateral acceleration of the vehicle, the lateral elements of the seat are also moved in the direction of the user of the seat.

Generally, vehicle occupant protection systems can have an optimum effect only if the vehicle occupants are in a specified sitting position. An exemplary embodiment of the invention is configured in such a way that a user of a seat is moved into an optimum sitting position in driving situations where there is a greater likelihood of a collision or sudden or unexpected acceleration.

A restraint system secures the upper body of a seated person in the longitudinal direction of the vehicle as a function of lateral dynamics. The restrain system may not only increase support of the seated person in the lateral direction of the vehicle but also increase support in the longitudinal direction of the vehicle. This lateral and longitudinal support may significantly improve the support of the seated person in the sideways direction because the seated person remains in a more effective sideways support area or is moved into the more effective support area.

According to one exemplary embodiment of the invention, a restraint system applies a force to the user of the seat that is dependent on the lateral dynamics. In another exemplary embodiment, the restraint system operates together with automatically adjustable seat components that provide additional lateral support to the seated person as a function of lateral accelerations.

In another exemplary embodiment, the restraint system may be a seat belt system that tensions a seat belt as a function of the lateral dynamics. Preferably, when the lateral dynamics exceed a lateral dynamics threshold value, the seat belt tension or force is increased by a predetermined amount over time to a predetermined value to reduce or eliminate the slack in the seat belt.

Tensioning of a seat belt typically involves shortening of the seat belt. A seat belt system is generally embodied in such a way that the seat belt is locked or prevented from being pulled out (i.e. extension) if the vehicle moves in a manner where an acceleration threshold value is exceeded. If tensioning of the seat belt takes place, the vehicle occupant can be "strapped-in" if the seat belt, which has been increasingly shortened due to tensioning, can no longer be pulled out because the vehicle executes a prolonged accelerated movement. Such a driving situation can occur when high performance vehicles corner at a high speed. For this reason, according to one exemplary embodiment, the tensioning of the seat belt, which is initially increased when highly accelerated movements of the vehicle occur, may be decreased again by a predetermined amount or drop over time after a predetermined time period of acceleration. In order to lock the seat belt when there are accelerated movements of the vehicle, when the tensioning of the seat belt is reduced, lengthening of the seat belt is permitted only to the length of the seat belt at the time the acceleration threshold value was exceeded.

A seat belt reel, which can be driven by a motor in order to tension the seat belt, can include a rotational angle sensor so that the change in rotational angle between tensioning of the seat belt and when the acceleration threshold value was exceeded can be determined. When the seat belt force or tension is reduced, the previous change in rotational angle of the seat belt reel may be unwound. When there is a correspondingly accelerated movement of the vehicle, the locking of the seat belt may be activated again.

Referring to FIG. 1, a seat belt 1 extends between a lock tongue 2 that can be locked in a lock 3, and a reel 4 onto which the seat belt 1 is wound when not in use. A corresponding torque is applied to the reel 4 by a spring arrangement 5 so that the reel 4 is biased to wind-up the seat belt 1 and the seat belt 1 can be pulled out when the vehicle occupant moves. The spring arrangement 5 is arranged between a reel-end counter bearing and a vehicle body-end counter bearing that can be adjusted by an electric motor 6 so the spring arrangement 5 exerts a controllable torque on the reel 4. A torque sensor 7 is disposed between the motor 6 and the spring arrangement 5 so that the torque exerted on the reel 4 and the seat belt force exerted by the seat belt 1 can be sensed. A locking device 8 locks the reel 4 against a rotational movement in the unrolling direction of the seat belt 1 if the reel 4 is rotated quickly or with high acceleration. The reel 4 is also locked by the locking device 8 if the vehicle executes an accelerated movement during which the acceleration exceeds a value of, for example, 0.3 g (g=acceleration of the earth). The locking device 8 includes a release device 9 that can be activated by a control circuit 10 and that, when electrically energized, prevents the locking device 8 from going into a locked state or cancels the locked state for as long as the electrical energization of the release device 9 lasts. An input of the control circuit is connected to a sensor system 11 that can monitor different parameters of the driving state of the vehicle, for example the lateral acceleration of the vehicle. The sensor system 11 can also include sensors related to other safety systems of the vehicle.

An input of the control circuit is connected to a rotational angle sensor 12 that includes the reel 4 so that the control circuit is capable of "detecting" the value of the rotational movements of the reel 4. In addition to the release device 9, the control circuit 10 can output signals to control the electric motor 6.

Figure 2:
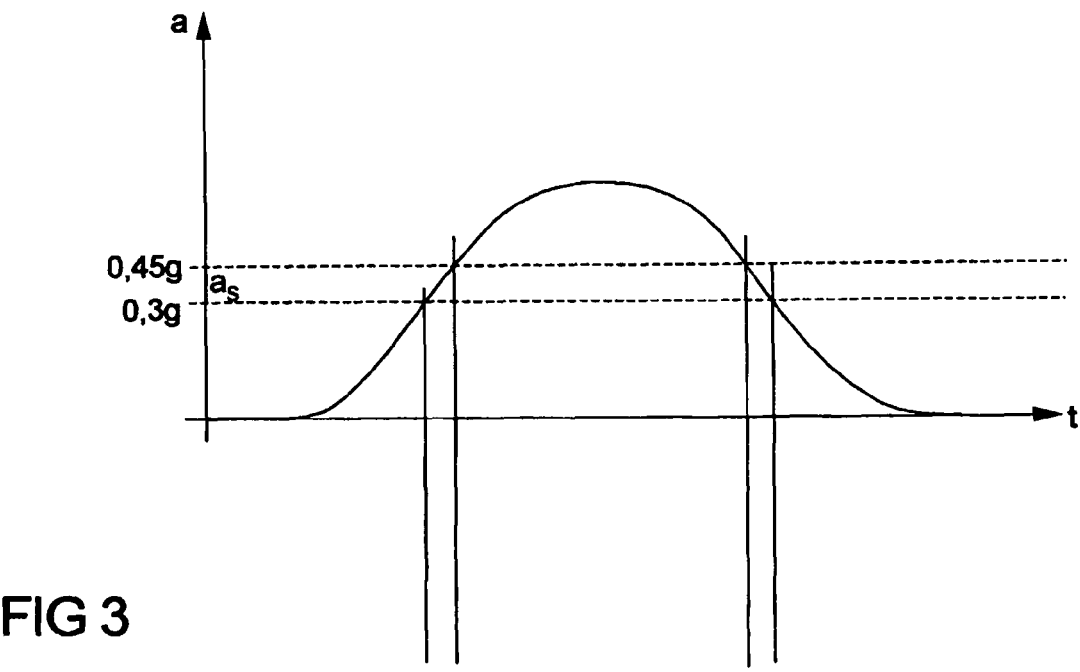
FIG. 2 is a diagram showing the variation over time of the lateral acceleration a vehicle experiences during an example driving situation according to an exemplary embodiment.
Figure 3:
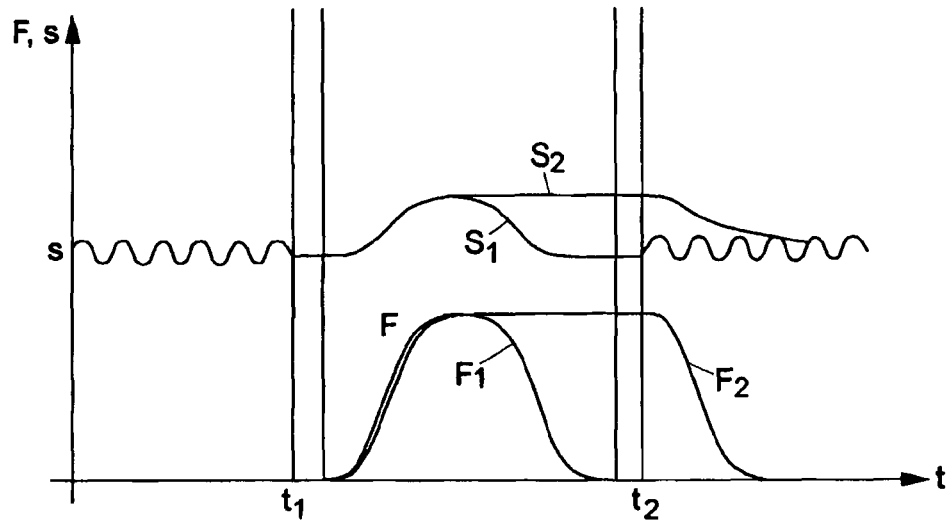
FIG. 3 is a diagram showing the variation over time of the seat belt force F and the length S of the part of the seat belt that is wound onto the associated reel according to an exemplary embodiment.

Referring to FIGS. 1 and 3, the function of the control circuit 10 is described in greater detail. Referring specifically to FIG. 2, when a driver operates the vehicle a driving situation may occur in which the vehicle experiences a lateral acceleration "a" between times t1 and t2. The lateral acceleration "a" first increases to exceed a value of 0.3 g and then drops again. The value of as =0.3 g is referred to below as a lateral acceleration threshold value.

The control circuit 10 may continuously receive signals relating to the lateral acceleration "a" from the sensor system 11. As soon as the control circuit 10 "detects" that the previously mentioned lateral acceleration threshold value as has been reached and/or exceeded, the electric motor 6 is actuated to tension the seat belt 1.

Referring also to FIG. 3, the seat belt force F rises correspondingly with the lateral acceleration "a." At the same time, the length "s" of the part of the seat belt 1 that has been wound onto the reel 4 also increases. The rotational angle sensor 12 allows the control circuit 10 to sense the rotational angle by which the reel 4 is rotated in order to tension the seat belt. The control circuit 10 therefore "knows" by what amount the rotational angle of the reel 4 has rotated starting at the time t1 at which the lateral acceleration "a" of the vehicle has reached or exceeded the lateral acceleration threshold value as. When the lateral acceleration threshold value is exceeded, the locking device 8 is also activated. The reel 4 is locked in its rotational direction corresponding to the unrolling direction of the seat belt 1 and can only then be rotated in the winding on direction of the seat belt 1. As a result, to a certain extent the seat belt user is "strapped in" to his seat and is forced into his specified sitting position.

The driving situation with a lateral acceleration that exceeds the lateral acceleration threshold value may last for a relatively long time, as can be the case for example, in high performance vehicles when traveling through lengthy bends on a freeway at high speed. In order to reduce the possibility of an unpleasant feeling by the vehicle occupant of being strapped in, the tensioning of the seat belt may be reduced. The release device 9 is energized electrically by the control circuit 10 and at the same time the electric motor 6 is actuated to rotate the vehicle body-end counter bearing of the spring arrangement 5 in the unwinding direction of the seat belt 1. The reel 4 executes a corresponding rotation and the part s of the seat belt that has been wound onto the reel 4 is correspondingly shortened. The control circuit 10 "monitors" the rotational angle of the reel 4 by the rotational angle sensor 12. As soon as the value of the rotational angle in the unwinding direction of the seat belt has reached the value of the rotational angle of the previously occurring winding of the seat belt 1, the energization of the release device 9 is ended so that the locking device 8 is activated again. If a lateral acceleration of the vehicle that exceeds the lateral acceleration threshold value is still present at the time when the electrical energization of the release device 9 is ended, the locking device 8 will lock the reel 4 from further rotation in the unwinding direction of the seat belt 1. As a result, although additional tensioning of the seat belt 1 that is brought about by the control circuit can be reversed, the length "s" of the wound-on part of the seat belt 1 may not be less than the value present at the time t1 when the lateral acceleration threshold value as was exceeded. The control circuit 10 may monitors itself continuously for malfunction. If the control circuit 10 cannot "detect" fault-free functioning during the self-diagnosis, the energization of the release device 9 and of the motor 6 is ended automatically so that the seat belt system behaves like a conventional seat belt system without tensioning of the seat belt as a function of the lateral acceleration.

The time period between the additional tensioning of the seat belt and the subsequent reduction in the seat belt force can be predetermined as desired, for example as indicated in FIG. 3 by the curves S1 and S2 and F1 and F2, respectively. In addition to predefinition by the manufacturer, the driver may also predetermine the time period by activating an input unit 13 that interacts with the control circuit and with which the operating behavior of other vehicle systems may also be set. In addition to a "comfort setting" in which the increased seat belt force is reduced after a comparatively short time period, a setting for "maximum safety" in which the seat belt force is not reduced until the lateral acceleration of the vehicle drops below the lateral acceleration threshold value may also be selected or defined. The input unit 13 can be embodied in such a way that the tensioning of the seat belt as a function of the lateral acceleration can be switched on only with automatically adjustable seat components that bring about sideways support of the vehicle occupant on the respective seat as a function of the lateral acceleration.

As is illustrated in FIG. 3, the locking device 8 releases the reel 4 if the vehicle does not experience any lateral acceleration or the respective lateral acceleration is below the lateral acceleration threshold value. When the locking device 8 releases the reel 4, the vehicle occupant may be able to pull out the seat belt 1 as far as possible, for example through a corresponding movement of his body. Given an opposed direction of movement of his body, the seat belt may then automatically wind again. This unlocked state is facilitated by the spring arrangement 5, which is arranged and embodied so that a certain retracting force is always exerted on the seat belt 1. The seat belt movements that are possible in driving situations with or without a lateral acceleration that drops below the threshold value as are indicated in FIG. 3 by wavy lines.

In contrast to the exemplary embodiment where the locking device 8 releases the reel 4, the seat belt 1 may be tensioned as a function of the lateral acceleration by movement of the lock 3. Lock 3 assumes an end position in its normal or design position. If the lock 3 is pulled away from this position by the motor 6 to tension the seat belt 1, the lock 3 can subsequently be released to reduce the tensioning of the seat belt and then move automatically into a position of use, for example a position before the tensioning of the seat belt. If the tensioning of the seat belt is performed only in driving states with a lateral acceleration that exceeds the lateral acceleration threshold value as (e.g., during a driving state in which the locking device 8 locks the seat belt reel 4 in the unwinding direction of the seat belt 1), when the seat belt is tensioned by means of a movement of the lock 3, with subsequent reduction of the tensioning of the seat belt there is no need for an arrangement corresponding to the release device 9.

It is noted that the invention can be implemented for use with normal vehicle occupants (e.g., adults) as well as with child seats.

Germany Priority Application 10 2007 002 704.6, filed Jan. 18, 2007 including the specification, drawings, claims and abstract, is incorporated herein by reference in its entirety.

Protection is claimed not only for feature combinations which are expressly specified or illustrated but also for in theory any desired combinations of the illustrated or specified features.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An arrangement for automatically supporting a vehicle occupant in a vehicle seat when lateral dynamic forces are acting, comprising:
    a restraint system for securing an upper body of the vehicle occupant in a longitudinal direction of the vehicle as a function of the lateral dynamics, the restraint system comprising:
        a seat belt;
        a control circuit, wherein the restraint system is configured to tension the seat belt if the control circuit detects that a lateral acceleration threshold value is reached;
        a locking device that locks the seat belt if the lateral acceleration exceeds the threshold value;
        a release device that, when electrically energized by the control circuit, cancels a locked state of the locking device, wherein the restraint system is configured to reverse the tensioning of the seat belt brought about by the control circuit during the energization of the release device; and
        an input unit interacting with the control circuit permitting the driver to predetermine a time period between the tensioning of the seat belt and the reversal of the tensioning.

2. The arrangement as claimed in claim 1, wherein the restraint system produces a restraining force that is a function of the lateral dynamics.

3. The arrangement as claimed in claim 2, wherein the restraint system tensions the seat belt as a function of the lateral dynamics.

4. The arrangement as claimed in claim 3, wherein the restraint system operates together with adjustable seat components that provide additional lateral support to the vehicle occupant dependent on lateral accelerations.

5. The arrangement as claimed in claim 4, wherein when the lateral dynamics exceed a threshold value, the seat belt tension is increased by a predetermined increase over time to a predetermined value or a value that is dependent on the lateral acceleration.

6. The arrangement as claimed in claim 5, wherein a shortening of the seat belt that is associated with the increase in the seat belt tension is sensed and at least partially reversed after a predetermined time period.

7. The arrangement as claimed in claim 6, wherein when the tensioning of the seat belt is reduced, lengthening of the seat belt is permitted only to a value present at the time the threshold value is exceeded.

8. The arrangement as claimed in claim 6, wherein when reversal of the shortening of the seat belt has finished, the seat belt is held in a locked state if the lateral acceleration exceeds the threshold value.

9. The arrangement as claimed in claim 3, further comprising a seat belt reel, wherein the seat belt reel is configured to be driven by a motor that includes a rotational angle sensor.

10. The arrangement as claimed in claim 1, wherein an input of the control circuit is connected to a sensor system that senses at least lateral accelerations of the vehicle.

11. A restraint system for an occupant of a vehicle comprising a seat belt system that is configured to tension a seat belt to secure an upper body of the vehicle occupant in a longitudinal direction of the vehicle as a function of the lateral dynamic forces on the occupant, the restraint system comprising:
    a seat belt;
    a control circuit, wherein the restraint system is configured to tension the seat belt if the control circuit detects that a lateral acceleration threshold value is reached;
    a locking device that locks the seat belt if the lateral acceleration exceeds the threshold value;
    a release device that, when electrically energized by the control circuit, cancels a locked state of the locking device, wherein the restraint system is configured to reverse the tensioning of the seat belt brought about by the control circuit during the energization of the release device; and an input unit interacting with the control circuit permitting the driver to predetermine a time period between the tensioning of the seat belt and the reversal of the tensioning.

12. The system of claim 11, further comprising a sensor system that senses at least lateral accelerations of the vehicle.

13. The system of claim 12, wherein when the lateral acceleration exceeds the threshold value, the seat belt tension is increased by a predetermined increase over time to a predetermined value or to a second value that is dependent on the lateral acceleration.

14. The system of claim 13, wherein a shortening of the seat belt that is associated with the increase in the seat belt tension is sensed and at least partially reversed after the predetermined time period.

15. The system of claim 14, wherein when the tensioning of the seat belt is reduced by lengthening the seat belt, the lengthening of the seat belt is permitted only to a value present at the time a threshold value of a vehicle lateral acceleration is exceeded.

16. The arrangement as claimed in claim 14, wherein when the shortening of the seat belt has finished, the seat belt is held in a locked state if a lateral acceleration of the vehicle exceeds the threshold value.

17. The system of claim 11, wherein the restraint system further includes adjustable seat components that provide additional lateral support to the occupant dependent on lateral accelerations.

* * * * *